United States Patent
Herbert

(10) Patent No.: US 6,317,469 B1
(45) Date of Patent: Nov. 13, 2001

(54) METHOD AND APPARATUS FOR UTILIZING A DATA PROCESSING SYSTEM FOR MULTI-LEVEL DATA COMMUNICATIONS PROVIDING SELF-CLOCKING

(75) Inventor: Brian K. Herbert, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 08/673,390

(22) Filed: Jun. 28, 1996

(51) Int. Cl.[7] ............................. H04L 25/49; H04L 7/06
(52) U.S. Cl. ................................. 375/293; 375/364
(58) Field of Search ..................... 375/286, 287, 375/293, 354, 362, 364; 327/141, 144

(56) References Cited

U.S. PATENT DOCUMENTS

| | | | |
|---|---|---|---|
| 4,234,898 | 11/1980 | Nakagawa et al. | 360/41 |
| 4,347,616 | 8/1982 | Murakami | 375/20 |
| 4,566,044 | 1/1986 | Langdon et al. | 360/40 |
| 4,571,735 | 2/1986 | Furse | 375/20 |
| 4,841,301 | 6/1989 | Ichihara | 341/126 |
| 4,941,151 | * 7/1990 | Abbiate et al. | 375/20 |
| 5,115,450 | 5/1992 | Arcuri | 375/7 |
| 5,198,818 | 3/1993 | Samueli et al. | 341/144 |
| 5,237,590 | * 8/1993 | Kazawa et al. | 375/20 |
| 5,295,155 | 3/1994 | Gersbach et al. | 375/4 |
| 5,303,265 | 4/1994 | McLean | 375/17 |
| 5,315,284 | 5/1994 | Bentley et al. | 340/146.2 |

* cited by examiner

*Primary Examiner*—William Luther

(57) ABSTRACT

A method and apparatus utilizing a data processing system are disclosed for multi-level data communication providing self-clocking. A first digital signal is input which includes a series of digital bits. One of a plurality of output levels is associated with each group of data bits for each of the plurality of the digital bits included within the first digital signal. A particular output level is associated with a clock output level. An output signal is generate which includes a transmission of the output level for each of the groups of digital bits and includes multiple transmissions of the clock output level, where a clock output level is transmitted after each transmission of an output level for each of the groups of digital bits.

26 Claims, 4 Drawing Sheets

METHOD AND APPARATUS FOR UTILIZING A DATA PROCESSING SYSTEM FOR MULTI-LEVEL DATA COMMUNICATIONS PROVIDING SELF-CLOCKING

BACKGROUND OF THE INVENTION

1. Technical Field

The present invention relates to the communication of self-clocked multi-level data providing a self-clock utilizing a data processing system; and, more particularly, describes a method and apparatus for associating each of a plurality of digital bits in a series of digital bits with an output level, wherein one output level is associated with a clock output level, and transmitting the output levels utilizing the data processing system. Still more particularly, the present invention relates to generating a series of digital bits and a clock signal in response to receipt of transmitted output levels, each output level being associated with one of a plurality of digital bits or a clock output level.

2. Description of the Related Art

As computer processing speeds have increased, new input/output port interfaces have been developed to deliver data at higher transfer rates. The desire for higher transfer rates has also resulted in the modification of previously known interfaces, such as the modification of the Small Computer Systems Interface, known as SCSI, to "Wide SCSI" and "Fast SCSI". Some known parallel port interfaces are now capable of transfer rates up to 2 Mbytes/sec.

In order to properly transfer data at the higher transfer rates utilizing parallel interfaces, shielding of the interface cable is required to limit electromagnetic interference. Shielding increases the cost of manufacturing such a cables and thus increases the cost associated with transferring data utilizing fast parallel interfaces.

Serial interfaces offer a lower cost solution because fewer cables are required. However, serial interfaces capable of supporting higher transfer rates are also more expensive to manufacture due to increased costs associated with necessary semiconductor processes.

Digital data is typically transferred by first converting the digital data into analog data utilizing a digital-to-analog converter (D/A converter). The analog data is then transmitted through an interface, such as a serial interface of a computer, and is then received at an interface of another device, such as a serial interface of a second computer or an I/O device such as a disk drive. There the data is converted from analog back to digital utilizing an analog-to-digital converter (A/D converter).

The digital data is encoded prior to transmission. Several methods are known for encoding digital data. The most common method is a simple one-to-one correspondence between bits and an analog output. For example, a binary bit "0" is represented by a low voltage while a binary bit "1" is represented by a high voltage. The voltage levels are the analog outputs and are received and decoded in order to reproduce the original digital data.

Another common method is called bi-phase coding, or "Manchester" encoding. In this method only two levels are required. Two transitions are required for each bit. Therefore, a transition from a high voltage level to a low voltage level may represent a binary "0" while a transition from a low level to a high level may represent a binary "1". A voltage transition occurs only when the digital data stream changes from one binary level to another. Therefore, if the data stream includes a stream of binary "1"'s, a transition occurs at the beginning of the stream and then no additional transition occurs. Because there are predictable transitions upon each bit transition, the receiver can be synchronized upon each transition. Therefore, synchronization occurs upon each bit transition.

Another known method of encoding is known as "bi-polar" encoding. Bi-polar encoding uses three levels to represent the encoded data. Each binary "1" is represented alternatively as either a positive or a negative voltage output level, with a binary "0" represented as an output level in between the positive and negative levels. The polarity of the output level representing a binary "1" alternatives between a positive voltage and a negative voltage for each binary "1" in the data stream.

SUMMARY OF THE INVENTION

A method and apparatus utilizing a data processing system are disclosed for multi-level data communication providing self-clocking. A first digital signal is input which includes a series of digital bits. The series of digital bits comprises a plurality of groups of digital bits. One of a plurality of output levels is associated with each group of data bits for each of the plurality of the digital bits included within the first digital signal. A particular output level is associated with a clock output level. An output signal is generated which includes a transmission of the output level for each of the groups of digital bits and includes multiple transmissions of the clock output level, where a clock output level is transmitted after each transmission of an output level for each of the groups of digital bits.

At the receive end, a clock signal is generated in response to a receipt of the multiple transmissions of the clock output level. A second digital signal is generated, in response to a receipt of the output signal, utilizing the received output levels for each of the groups of digital bits and the received transmissions of the clock output level, so that the second digital signal is the equivalent of the first digital signal.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

The present invention provides a method and apparatus in transceivers for encoding one or more bits of digital data into the magnitude of a current or voltage pulse. Large groups of digital bits, such as words (32 bits) are transmitted by encoding bits on one or more pulses.

Figure 1:
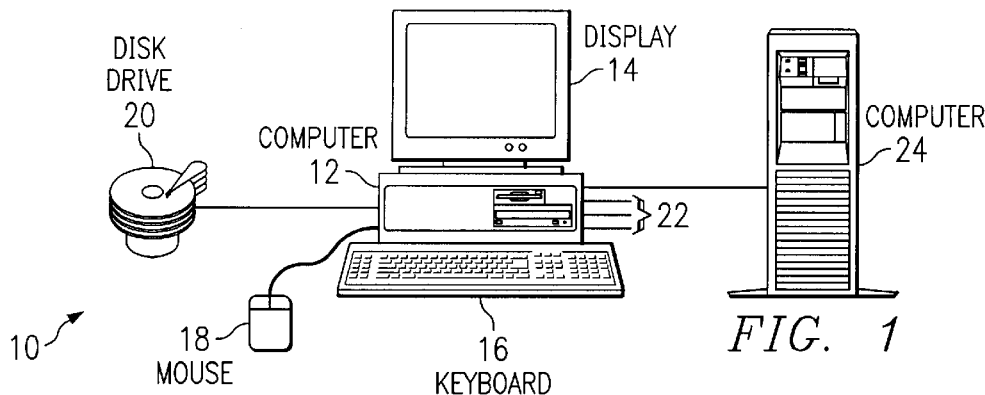
FIG. 1 depicts a pictorial representation of a data processing system in accordance with the present invention.

With reference now to the figures and in particular with reference to FIG. 1, there is depicted a pictorial representation of a data processing system 10 which includes a computer 12, a display 14, a keyboard 16, a mouse 18, a disk drive 20, and additional input/output (I/O) ports 22. Display 14, keyboard 16, mouse 18, and disk drive 20 are I/O devices which may transmit and/or received data from computer 12. Those skilled in the art will recognize that I/O ports 22 may include a number of different types of ports, such as serial or parallel ports. One of additional I/O ports 22 may be utilized to connect computer 12 to other computers, such as computer 24 so that computer 12 may transmit and receive data from computer 24.

Figure 2:
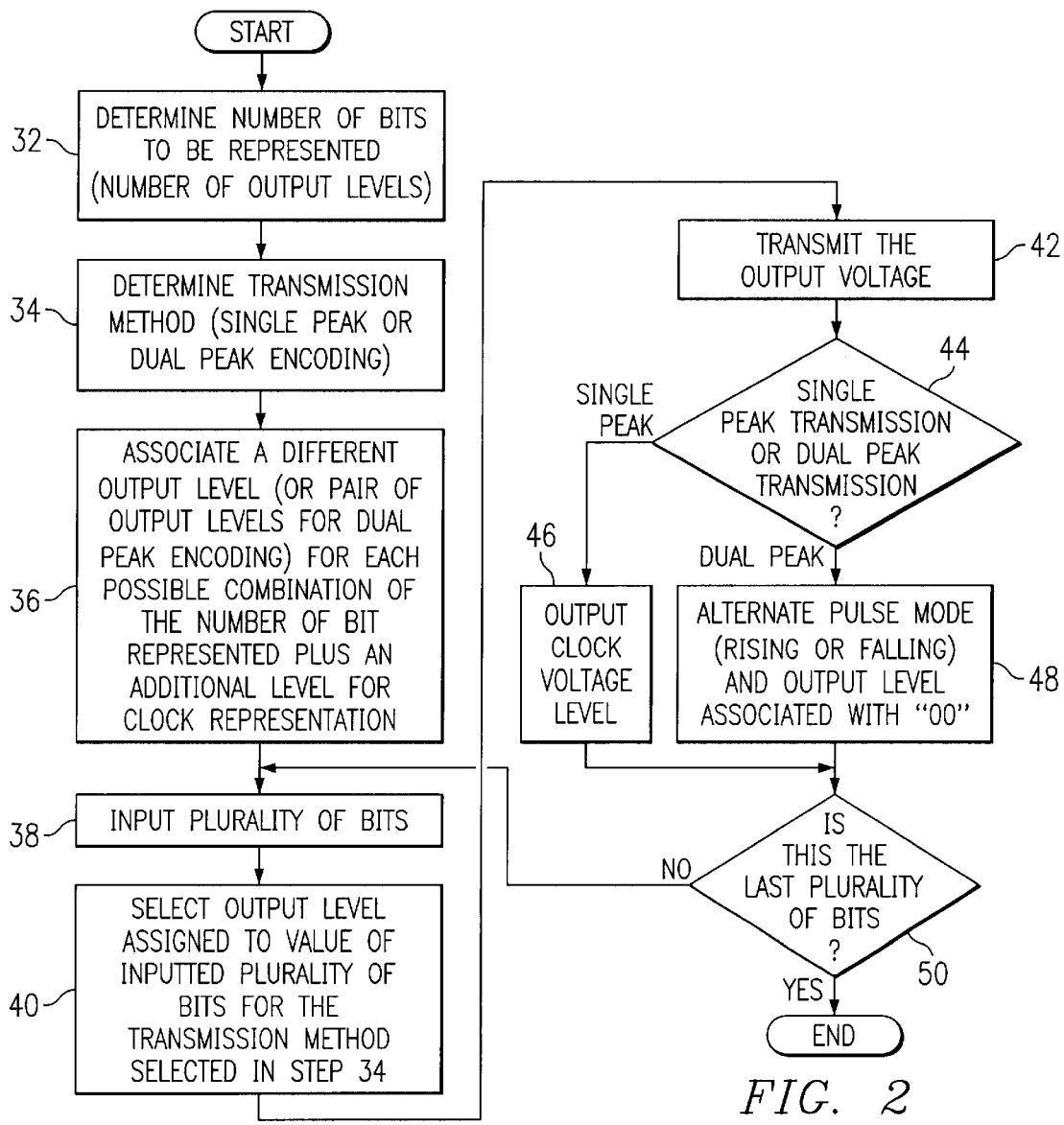
FIG. 2 is a high-level flowchart which depicts the association of each of a plurality of digital bits and a clock level with an output level in accordance with the present invention.

The data transmitted by computer 12 to the various I/O devices is typically digital data which must be encoded prior to transmission. The digital data includes a digital signal. A digital signal, which includes a series of consecutive digital bits, may need to be transferred to an I/O device or computer 24. Those skilled in the art will recognize that this signal may be transmitted utilizing a variety of transmission media, such as cable television, satellite broadcast systems, cable modems, or other devices. FIG. 2 is a high-level flow chart which depicts encoding and transmitting the encoding data according to the present invention. FIG. 2 depicts the association of each of a plurality of digital bits and a clock level, which are included within a first digital signal, with output levels in accordance with the present invention. The process begins by determining a number of bits to be represented by each output level (step 32). For example, each output level, which may be an output current level or output voltage level, may represent a group of two consecutive bits. Next, a different output level is associated with every possible combination of the number of bits. Continuing the example from above, if each output level represents two bits, the following possible combination of bits would each be associated with a different output level: binary bits "00", "01", "10", and "11". Next, the transmission method is selected (step 34). The transmission method may include, for example, a single peak method where data is encoded only on the rising pulse, or dual peak method where data is encoded on rising and falling pulses.

Next a different output level (or pair of output levels for dual peak transmission method) is associated with every possible combination of the number of bits, plus an additional level is associated with a clock output (step 36). Continuing with the example from above, if each output level represents two bits, the following possible combination of bits would be associated with a different output level; binary bits "00", "01", "10", and "11". Since a different level is associated with the clock output, there are five levels needed for the single peak transmission method, one for each of the possible data values and one for the clock. For the dual peak transmission method, two levels are used to represent each possible data bit, one for rising pulses and one for falling pulses, resulting in eight levels representing data, plus one level for clock, for a total of nine levels.

Then, a group of bits which are included within a first digital signal are inputted (step 38). The first digital signal includes a series of consecutive digital bits. Each of the inputted groups of bits is one of the possible combinations of bits. In the example, the inputted plurality of bits will be either "00", "01", "10", or "11". Next, a determination of an output level associated with the combination of bits represented by the inputted group of bits relative to the transmission mode selected in step 34 is made (step 40) For example, if the input group of bits is "01", the output level associated with combination of bits "01" is associated with that inputted group of bits.

The output voltage level associated with the inputted group of bits is then transmitted (step 42). A determination is then made as to whether single peak transmission or dual peak transmission was selected (step 44). Then, if the single peak transmission method is used, the voltage level associated with the clock signal is output (step 46). If the dual peak transmission method is being used, the transmitter alternates from rising pulse mode to falling pulse mode, or from falling pulse mode to rising pulse mode, (depending on the mode used for the previous transmission) and output the level associated with a data input value of "00" (step 48). The process then determines whether this is the last group of bits in the first signal (step 50). If a determination is made that this is the last plurality of bits in the signal, the process terminates. If a determination is made that this is not the last plurality of bits in the first signal, the process returns to step 38.

In this manner, an output signal is generated which includes a transmission of the output level for each of the groups of digital bits and a transmission of a clock output level after each transmission of the output level for each of the groups of digital bits. Multi-level data communication is accomplished by the transmission of a plurality of groups of digital bits followed by a clock output level, providing a self clocking format.

Figure 3A:
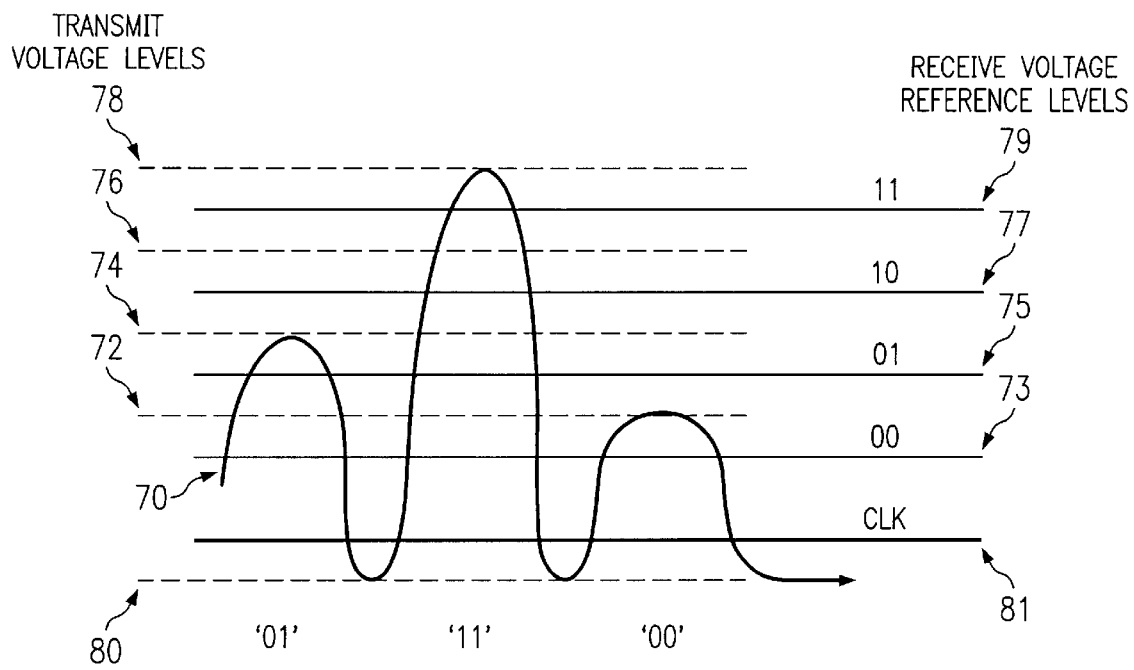
FIG. 3A depicts an output signal 70 generated utilizing the transmitted output levels, when a single peak encoding method is used, in accordance with the present invention.

FIG. 3A shows single peak encoding mode transmit and receive voltage levels and depicts a transmitted pulse 70. Note that transmit levels exceed receive levels by half the voltage difference between receive voltage reference levels, also called input levels. This provides noise immunity and faster operation of receive circuitry. In FIG. 3A, voltage levels for transmitting two digital bits are depicted. Four (4) output levels, 72, 74, 76, and 78 have been associated with each possible combination of bits. Output level 72 has been associated with combination "00"; output level 74 has been associated with combination "01", output level 76 has been associated with combination "10"; and, output level 78 has been associated with combination "11". Output level 80 has been associated with a clock output level. Four input levels, 73, 75, 77, and 79, also called receive voltage reference levels, have been associated with each possible combination of bits. Input level 73 has been associated with combination "00"; input level 75 has been associated with combination "01"; input level 77 has been associated with combination "10"; input level 79 has been associated with combination "11"; and input level 81 has been associated with a clock receive level.

A group of bits, "01", has been inputted and determined to be associated with output level 74. In accordance with the present invention, output level 74 was transmitted. Thereafter, a clock output level 80 was transmitted. Next, a group of bits, "11", was input and determined to be associated with output level 78. Output level 78 was transmitted. Thereafter, a clock output level 80 was again transmitted. Next, a group of bits, "00", was input and determined to be associated with output level 72. Output level 72 was transmitted. Thereafter, a clock output level 80 was again transmitted.

Figure 3B:
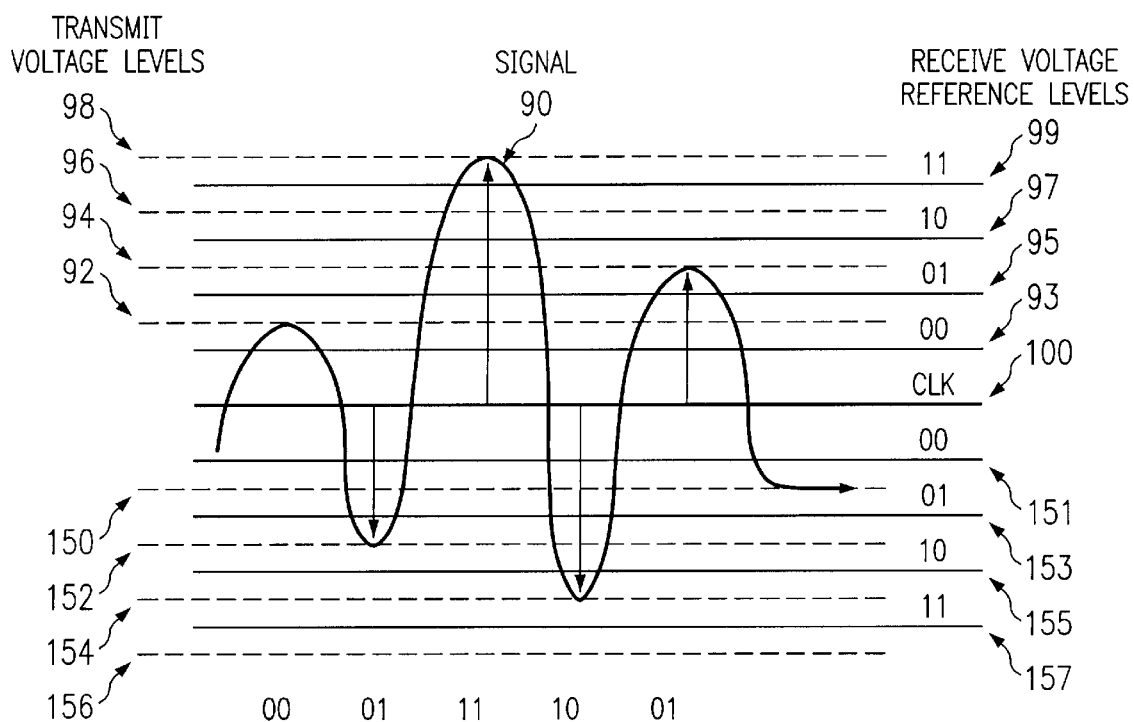
FIG. 3B depicts an output signal 90 generated utilizing the transmitted output levels, when a dual peak encoding method is used, in accordance with the present invention.

FIG. 3B depicts an output signal 90 generated utilizing the transmitted output levels when the dual peak encoding method is used, in accordance with a preferred embodiment of the present invention. Input levels 93, 95, 97, 99, 100, 151, 153, 155, and 157, also called receive voltage reference levels, are associated with bits as in FIG. 3A. The number of bits to be represented by each output level has been selected to be two (2). Two output levels are associated with each digital value represented, one output level for rising pulses and the other output level for falling pulses. For the four possible combinations of the two digital bits, eight output voltage levels, four for rising pulses and four for falling pulses, are used for data transmission. The digital value "00" is represented by output level 92 for rising pulses and by output level 150 for falling pulses. Similarly, the digital value "01" is represented by output level 94 for rising pulses and by output level 152 for falling pulses; and the digital value "10" is represented by output level 96 for rising pulses and by output level 154 for falling pulses; and the digital value "11" is represented by output level 98 for rising pulses and by output level 156 for falling pulses.

A group of bits, "00", has been inputted and determined to be associated with output level 92. Output level 92 is transmitted as the rising pulse. The next group of bits inputted is "01", at which time the transmitter alternates to falling pulse mode, such that an output level 152 is transmitted, causing the output signal to traverse clock reference voltage 100. Next, a group of bits "11" was input and the transmitter alternates to rising pulse mode and associates output level 98 with the "11" inputted value. The output voltage 98 is transmitted, causing the output signal to again traverse clock level 100. Next, a group of bits "10" was input and the transmitter alternates to falling pulse mode and associates output level 154 with the "10" inputted value. The output voltage 152 is transmitted, causing the output signal to again traverse clock level 100. Finally, the group of bits "01" was input and the transmitter alternates to rising pulse mode and associates output level 94 with the '01' inputted value. The output voltage 94 is transmitted, causing the output signal to again traverse clock level 100. After all inputted groups of bits have been transmitted, the transmitter alternates to either rising or falling pulse mode and outputs the voltage level associated with "00". This causes the output signal to traverse clock level 100, thereby clocking the last set of data. The output voltage is held at the level representing "00" until additional bits are inputted at which time the signal magnitude remains the same if the inputted value is "00" or is increased to the magnitude associated with the inputted value.

Figure 4A:
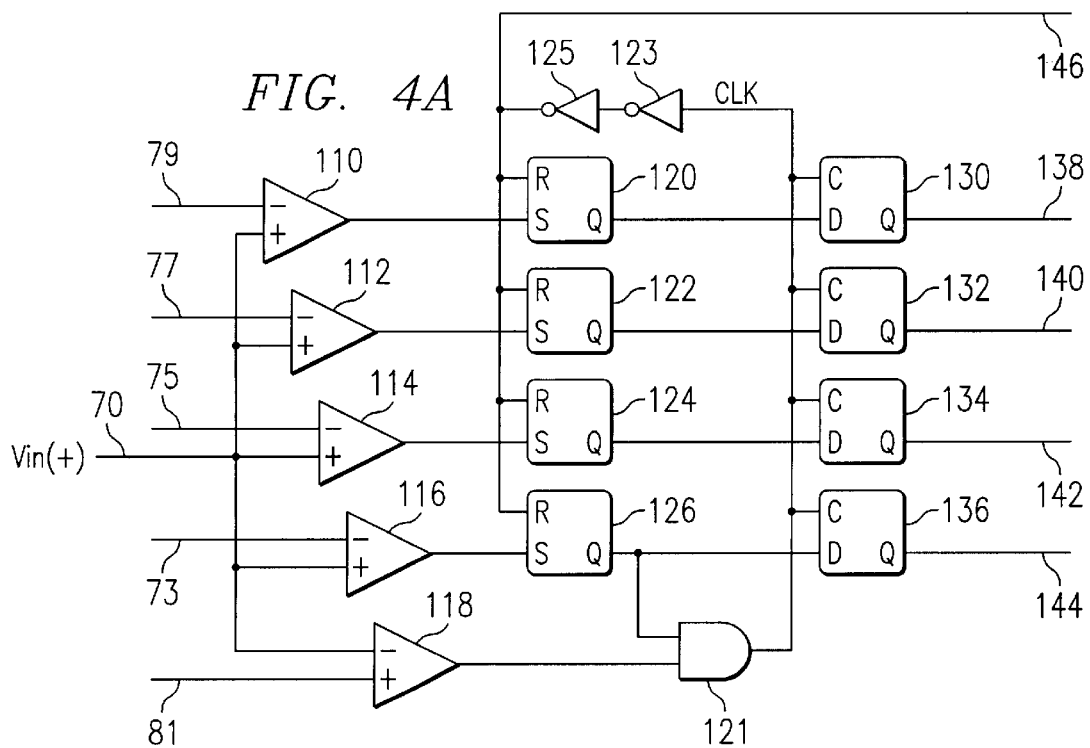
FIG. 4A illustrates a circuit for receiving the transmitted output signal 71 which may be utilized to determine a second digital signal and a clock signal in accordance with the present invention.

FIG. 4A illustrates a circuit for receiving a transmitted signal 70 which may be utilized to determine a second digital signal and a clock signal in accordance with the present invention. A received signal (signal 70 in FIG. 4A) is substantially similar to the transmitted signal (signal 70 in FIG. 3A but may vary in intensity and phase due to transmission medium characteristics. Signal 70 is received and input into the plus (+) input of comparators 110, 112, 114, and 116. Signal 70 is input into the negative (−) input of comparator 118. The other input for each comparator is connected to an input reference voltage. For example, comparator 110 has as its negative input receive reference voltage level 79 and as its positive input signal 70. When the level of signal 70, which is the positive input, rises above voltage reference level 79, which is the negative input, the comparator's output goes high, i.e., it generates an output of a logical, or binary, one. When the level of signal 70 falls below reference voltage level 79, the comparator's output goes low, i.e. it generates an output of a logical, or binary, zero. For example, when the level of signal 70 rises above receive voltage reference level 73, the output of comparator 116 will go high. Comparator 118 has as inputs input reference voltage level 81 and signal 70.

The output of comparators 110, 112, 114, and 116 are connected to the "set" input of flip-flops 120, 122, 124, and 126 respectively. When flip-flop 120 receives a high level output from comparator 110, flip-flop 120 is set; when flip-flop 122 receives a high level output from comparator 112, flip-flop 122 is set; when flip-flop 124 receives a high level output from comparator 114, flip-flop 124 is set; and when flip-flop 126 receives a high level output from comparator 116, flip-flop 126 is set.

In accordance with the description given above and with reference again to FIG. 3A, after each transmission of an output level associated with a group of bits, a clock output level is transmitted. Therefore, after a transmission of output level 72, which is a associate with bits "00", a clock level output 80 is transmitted. Clock output level 80 is less than reference level 81. Therefore, when signal 70 from FIG. 3A includes a transmission of a clock output level, comparator 118 will generate a high level output.

Comparator 118 generates a output which is received by AND gate 121. AND gate 121 has as inputs the output of comparator 118 and the output of flip-flop 126. The output of AND gate 121 is received by latches 130, 132, 134, and 136 as clock inputs. The output of AND gate 121 is received by inverter 123 and is inverted. The output of inverter 123 is received by inverter 125 and is inverted. The output of inverter 125 is received as reset inputs by flip-flops 120, 122, 124, and 126.

When signal 70 drops below reference level 81, the values of flip-flops 120, 122, 124, and 126 are then clocked into and stored in latches 130, 132, 134, and 136, respectively, and the flip-flops reset to a zero value. The data in the latches may be accessed from outputs 138, 140, 142, and 144. Outputs 138, 140, 142, and 144 may be utilized to generate a signal, which is equivalent to signal 70. Data availability is signaled by a clock signal from output 146 which is the output of inverter 125. After signaling data availability, data is available following propagation through latches 132–136. A clock signal may be generated utilizing output of inverter 125.

Figure 4B:
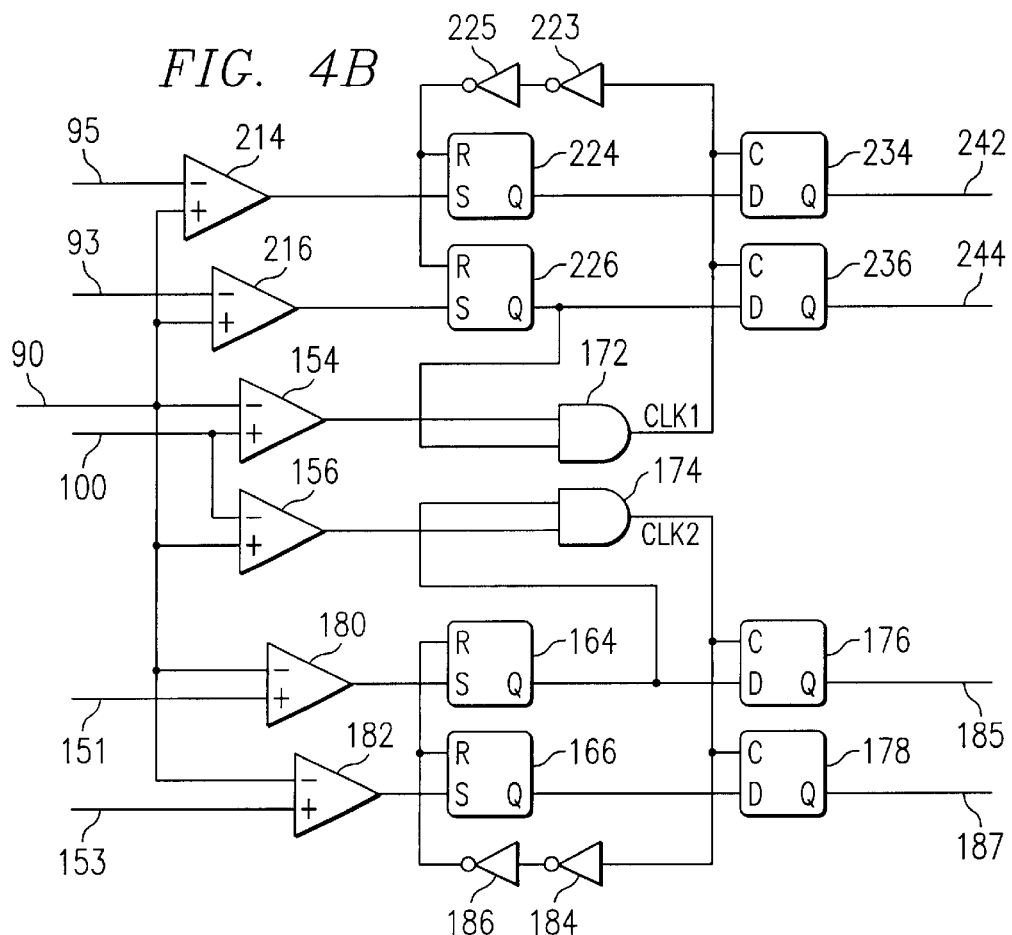
FIG. 4B illustrates a circuit for receiving the transmitted output signal 90 which may be utilized to determine a second digital signal and a clock signal according to the present invention.

FIG. 4B illustrates a circuit for receiving a transmitted signal 90 which may be utilized to determine a second digital signal and a clock signal in accordance with the present invention. FIG. 4B depicts circuitry for reception of transmitted levels 93, 95, 151, 153 and detection of traversal of clock reference voltage 100.

The circuit of FIG. 4B operates similarly to the circuit of FIG. 4A. If the circuit of FIG. 4B is operating in a rising pulse mode, signal 90 will be a voltage level which always exceeds receive reference voltage 93 (level 93 represents "00"). Exceeding receive reference voltage 93 results in comparator 216 outputting a positive voltage which is connected to the "SET" input of flip-flop 226 so that flip-flop 226 is always "SET" when receiving a positive polarity signal. Signal 90 may then increase to a voltage level which represents a group of digital bits, and is then decreased to a voltage level which is less then clock reference voltage 100. When the level of signal 90 falls below clock reference voltage 100, the circuit transitions to a falling pulse mode. By traversing clock reference voltage 100, the output of comparator 154 goes high. Comparator 154 is employed to generate a clock signal when the input signal falls below clock reference voltage 100 while comparator 156 is employed to generate a clock signal when the signal rises above clock reference voltage 100. When the level of received signal 90 falls below clock reference voltage 100, comparator 154 provides a logical one output. This output is received by AND gate 172 so that the output of AND gate 172 is a logical one as a result of signal 90 previously exceeding receive reference voltage level 93 and then dropping below clock reference voltage 100. When the output of AND gate 172 becomes a logical one, the output of flip-flops 224 and 226 are clocked into data latches 234 and 236, respectively. Inverter 223 receives the output of AND gate 172 and inverts the signal. Inverter 225 receives the output of inverter 223 and inverts the signal. The output of inverter 225 is received as reset inputs to both flip-flops 226 and 224. Inverters 223 and 225 provide a delay element which provides sufficient time for the flip-flops to be clocked into the latches prior to the flip-flops being reset by the output of inverter 225. When the output of inverter 125 goes high, flip-flops 226 and 224 are reset. This results in a logical zero being output by the flip-flops. Since the output of flip-flop 226 is connected to the input of AND gate 172, the output of AND gate 172 becomes a logical zero. This prevents multiple clock pulses if the input signal 90 is noisy.

The input signal 90 continues to decrease in voltage level to a maximum low level which is less then reference voltage level 151 which is associated with the group of bits being "00". As the input voltage falls below reference voltage level 151, the output of comparator 180 goes high. The output of comparator 180 is connected to the "SET" input of flip-flop 164 such that when input voltage 90 drops below reference voltage level 151, it results in flip-flop 164 being set. After attaining the lowest level needed to represent the transmitted bits, the input signal 90 then increases in voltage so that the circuit is in the positive mode of operation. As the voltage increases past reference voltage 100, the output of comparator 156 goes high. Since flip-flop 164 has a logical one output from the preceding variation in input voltage, AND 174 has both inputs at a logical one and therefore outputs a logical one. This causes the outputs of flip-flops 164 and 166 to be clocked into latches 176 and 178 respectively. Outputs 244, 242, 185, and 187 may be utilized to generate a signal which is equivalent to signal 90. The output from inverter 225 may be utilized to clock the data from outputs 244 and 242. The output from inverter 186 may be utilized to create a signal to clock the data from outputs 185 and 187.

A data transmission system employing the invention typically consists of a host connection and a peripheral connection. Due to variations in temperature, supply voltage, and manufacturing processes between the host and peripheral interfaces, it is desirable to be able to adjust the voltage levels used for data transmission or voltage reference levels used for data reception.

Calibration allows a smaller voltage difference between voltage levels assigned to each set of digital bits such that more data can be transmitted with each pulse. There also exists some minimum number of levels, called Nmin, that can be supported prior to calibration. For example, prior to calibration, transmitter and receiver may be able to correctly transmit data if the difference between voltage levels is 0.5 volts, but after calibration may be able to transmit data using levels that have a 0.1 volt difference.

Calibration may be accomplished by the host controller issuing a "command" signal. One implementation for a command signal is to drive the signal line connecting transmitter and receiver to a voltage which is significantly higher than that used for data transmission. For example, it is envisioned that all data transmission will use voltages that are less than two volts, such that if a voltage between three and five volts is driven on the signal line, it can easily be discerned from voltages used for data transmission and be interpreted by the receiving unit as a special signal.

Figure 5A:
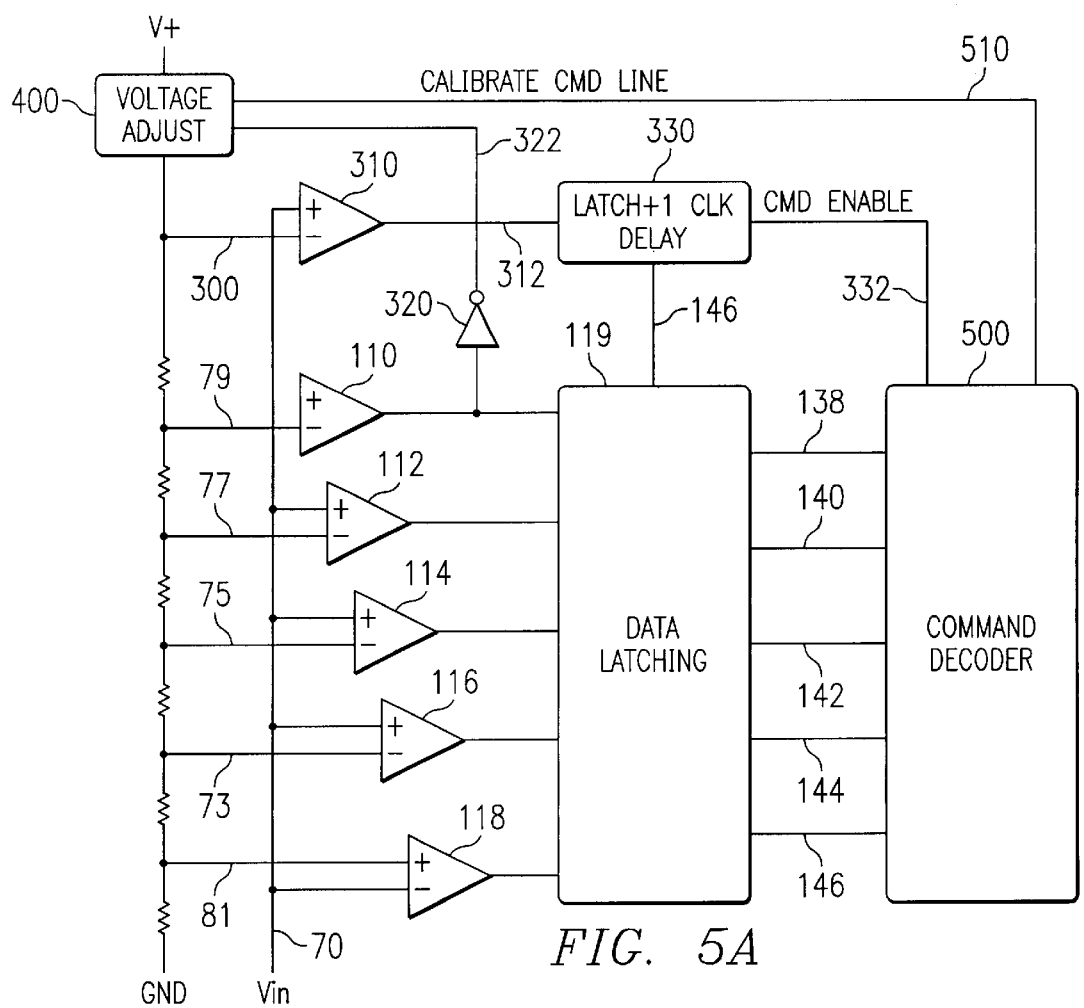
FIG. 5A illustrates a modification which may be made to either the circuit of FIG. 4A or 4B in order to permit calibration in accordance with the present invention.

FIG. 5A illustrates a calibration mechanism that operates in conjunction with the circuitry shown in FIG. 4A. Comparator 310 has signal line input 70 as the connection to the positive input terminal and voltage reference 300 as the input to the negative terminal. When signal input 70 exceeds the voltage reference 300, output signal 312 of comparator 310 will transition to a logical one output level, indicating that the next transmission will contain 'command' information. Output signal 312 is input to a one clock delay unit 330. This unit delays the transfer of the CMD signal to the command decoder 500 by one clock. All data bits are set when a command signal is issued such that the next data transmission is used to transfer the data for command mode.

Figure 5B:
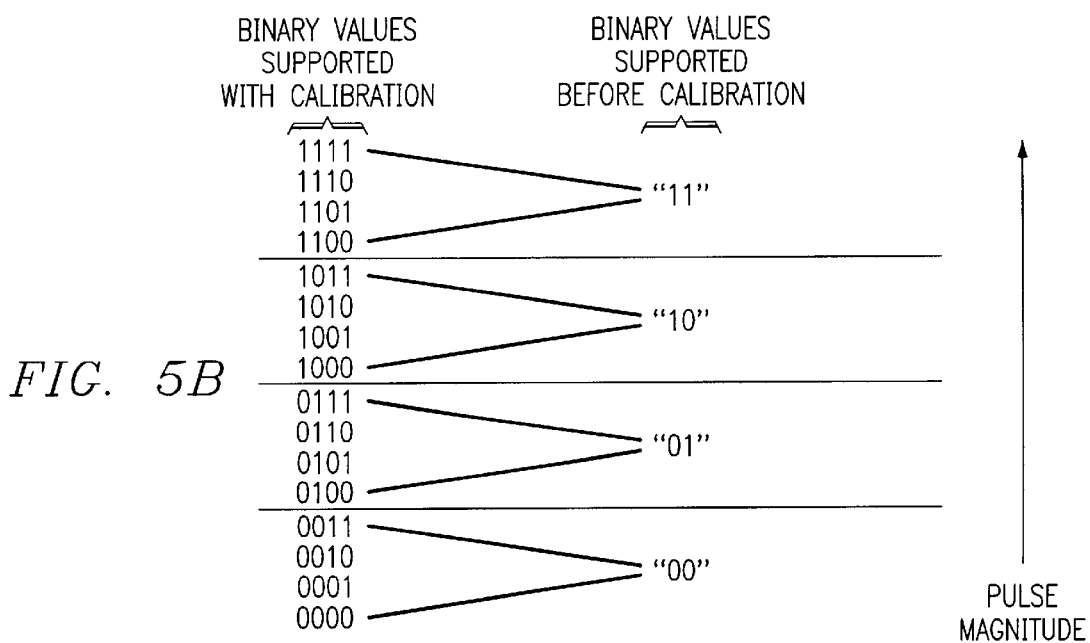
FIG. 5B is a diagram of supported binary values before and after calibration according to the present invention.

Following the issuance of a command signal, the receiver may configure itself to operate with a reduced number of data levels (actually using only the most significant bits of some greater number of transmitted bits) as illustrated in FIG. 5B. This allows communication of command information prior to calibration and under conditions where higher levels of noise may exist.

The command data following the issuance of the command signal is inputted into a command decoder as shown in FIG. 5A. The command decoder activates output signals dependant on the value of the inputted data. Depending on the complexity of the system, the command decoder may utilize multiple data transmissions to form the command data value.

If the command data value consists of two bits, which might be transferred in a single transmission or may be transferred in two transmissions, they could represent commands as shown below.

| Bit Value | Command |
| --- | --- |
| 00 | Reset |
| 01 | Output 'all ones' voltage |
| 10 | Calibrate |
| 11 | Other (low power mode, etc) |

When a command data value specifies calibrate, the calibrate command signal 510 is driven to an active level by the command decoder 500.

Calibration of a peripheral receiver is accomplished by the host system issuing a command signal, followed by a data specifying the calibrate command, followed by a voltage value associated with of all data bits being a one value.

Upon decoding the calibrate command, the receiver configures voltage adjust unit 400 to output its highest voltage and switches in additional resistance equal to half the value of the resistance between reference voltages. This resistance serves to establish the offset of receive and transmit levels depicted in FIGS. 3A and 3B. Output of the highest voltage from voltage adjust unit 400 causes reference voltage 79 to be higher than inputted voltage 70, resulting in comparator 110 output being a digital zero. Voltage adjust unit slowly decreases its output voltage. At some point in time, reference voltage 79 drops below inputted voltage 70, causing output of comparator 110 to transition to a logical one value. This results in the output 322 of inverter 320 to transition to a logical zero value, causing the voltage adjust unit to stop decreasing its output voltage 300 and switch out the resistance used to produce offset receive levels.

The transmitter portion of the invention (not shown) then outputs a voltage between three and five volts to signal the host unit that calibration is completed. In an alternate method, the host unit could wait some period of time which is adequate for the peripheral unit to complete the calibration process. Receive signal is substantially similar to the transmitted signal but may vary in intensity and phase due to transmission medium characteristics. Thus, the calibration process may be employed to overcome variations in the transmission medium caused by factors, such as temperature, voltage, and manufacturing processes.

As shown in the command table above, the host unit can instruct the peripheral unit to output a voltage associated with all data bits being set, thereby allowing the host unit to calibrate its receiver. In this manner both transmitter and receiver can be calibrated and, as noted earlier, higher data transmission rates can be achieved by using voltage levels which have a smaller difference between them.

While the invention has been particularly shown and described with reference to a preferred embodiment, it will be understood by those skilled in the art that various changes in form and detail may be made therein without departing from the spirit and scope of the invention. For example, although the depicted example is directed towards encoding digital data into the magnitude of a voltage pulse, the presently claimed invention also can be implemented by encoding digital data into the magnitude of a current, intensity of a light source or other electromagnetic wave, or through the magnitude in variation of a frequency.

What is claimed is:

1. A method for communication of data utilizing a data processing system, comprising a plurality of output levels, and further comprising the steps of:
    inputting a first digital signal including a series of digital bits;
    grouping the digital bits of the series of digital bits into a plurality of types of groups;
    for each type of group of digital bits, associating said type of group of said digital bits with one of said plurality of output levels;
    associating a particular one of said output levels with a clock output level; and
    generating an output signal including a transmission of each output level associated with the each of said plurality of groups of said digital bits included within said first signal and a plurality of transmissions of said clock output level, wherein one of said plurality of transmissions of said clock output level occurs after each transmission of said one of said output levels for each said group of said digital bits.

2. The method according to claim 1, further comprising the step of responsive to a receipt of said output signal, generating a clock signal utilizing said plurality of transmissions of said clock output level.

3. The method according to claim 2 wherein said step of generating a clock signal further comprises:
    detecting when said output signal traverses said clock output level; and
    generating a clock pulse only in response to each detection.

4. The method according to claim 1, further comprising the step of responsive to a receipt of said transmission of said one of said plurality of output levels for each said group of said digital bits and said plurality of transmissions of said clock output level, generating a second digital signal utilizing said received one of said plurality of output levels for each said group of said digital bits and said received clock output level, wherein said second digital signal is the equivalent of said first digital signal.

5. The method according to claim 1, wherein said step of for each group of digital bits, associating said group of digital bits with one of a plurality of output levels further comprises associating a group of consecutive digital bits with one of a plurality of output levels for each said group of consecutive digital bits.

6. The method according to claim 1, further comprising associating each said group of digital bits with a magnitude of a pulse with respect to a median value and wherein said transmission of said one of said output levels for each said group of said digital bits includes said pulse alternating between rising and falling modes, wherein said magnitude is a magnitude of either a rising or falling pulse and said clock level is associated with a median pulse value transmitting said pulse.

7. An apparatus for communication of data utilizing a data processing system, comprising:
    means for inputting a first digital signal including a series of digital bits such that said digital bits can be grouped into a plurality of types of groups of digital bits;
    for each type of group of digital bits included within said first signal, means for associating said type of group of digital bits with one of a plurality of output levels;
    means for associating a particular one of said output levels with a clock output level; and
    means for generating an output signal including a transmission of said one of said plurality of output levels for each of said plurality of groups of said digital bits, as associated by type of group, and a plurality of transmissions of said clock output level, wherein one of said plurality of transmissions of said clock output level occurs after each transmission of said one of said output levels for each of said plurality of groups of said digital bits.

8. The apparatus according to claim 7, further comprising means responsive to a receipt of said output signal, for generating a clock signal utilizing said plurality of transmissions of said clock output level.

9. The apparatus according to claim 8 wherein said means for generating a clock signal further comprises:
    means for detecting when said output signal traverses said clock output level; and
    means for generating a clock pulse only in response to each detection.

10. The apparatus according to claim 9 wherein said means for generating a clock signal further comprises:
    means for generating a clock pulse when said input signal traverses said clock reference level; and
    means for inhibiting clock signal generation until said input signal exceeds the reference voltage level associated with an inputted bit having a digital value of zero.

11. The apparatus according to claim 8, further comprising means responsive to a receipt of said transmission of said one of said plurality of output levels for each said group of said digital bits and said plurality of transmissions of said clock output level, for generating a second digital signal utilizing said received one of said plurality of output levels for of said group of said digital bits and said received clock output level, wherein said second digital signal is the equivalent of said first digital signal.

12. The apparatus according to claim 8, wherein said for each group of digital bits, means for associating said group of digital bits with one of a plurality of output levels further comprises means for associating a group of consecutive digital bits with one of a plurality of output levels for each said group of consecutive digital bits.

13. The apparatus according to claim 8, further comprising:
 a median pulse value; and
 a means for associating each of said plurality of groups of said digital bits with a magnitude of a pulse with respect to the median value and wherein said transmission of said one of said output levels for each of said plurality of groups of said digital bits includes said pulse alternates between rising and falling modes, wherein said magnitude is a magnitude of either a rising or falling pulse and said clock level is associated with the median pulse value transmitting said pulse.

14. An apparatus for determining a digital signal and a clock signal, comprising:
 a first comparator having as inputs a first reference level and an input signal having an input level and generating a first output, wherein said first output is a logical one in response to said first input level being greater than said first reference level and a logical zero in response to said first input level being less than said first reference level;
 a second comparator having as inputs a second reference level and said input signal and generating a second output, wherein said second reference level is lower than said first reference level, and wherein said second output is a logical one in response to said input level being less than said second reference level and a logical zero in response to said input level being greater than said second reference level;
 an AND gate having as inputs said second output and a fourth output from a first flip-flop, and generating a third output;
 a first inverter having as its input said third output, and generating a fourth output;
 a second inverter having as its input said fourth output, and generating a fifth output; wherein said first inverter and said second inverter function as a signal delay unit for said third input, providing said fifth output signal as a delayed representation of said third input;
 a first flip-flop having said first output coupled to its set input, wherein said first flip-flop is set in response to said first input level being greater than said first reference level, and said fifth output coupled to its reset input, and generating a sixth output; and
 a first latch having as inputs said third output and sixth output, wherein said latch stores said sixth output in response to said input level being less than said second reference level, wherein said first latch output may be utilized to determine an output signal which is equivalent to said input signal, and further wherein said third output may be utilized to determine an output clock signal.

15. The apparatus according to claim 14 further comprising a third comparator having as inputs a third reference level and said input signal and generating a seventh output, wherein said seventh output is a logical one in response to said input signal being greater than said third reference level and a logical zero in response to said input signal being less than said third reference level, wherein said third reference level is greater than said first reference level.

A second S/R flip-flip having as inputs said seventh output and said fifth output wherein said flip-flop is set in response to said input signal being greater than said third reference level, said flip-flop generating an eighth output, wherein said eighth output is a logical one in response to said input signal being greater than said third reference level and being a logical zero in response to said fifth output being a logical one; and a second latch having as inputs said third output and eighth output wherein said latch stores said eighth output in response to said input level being less than said second reference level, wherein said second latch output and said first latch output may be utilized to determine an output signal which is equivalent to said input signal, and further wherein said third output may be utilized to determine an output clock signal.

16. An apparatus for communicating data, comprising:
 a processor for processing data;
 a communication interface utilized during a receipt and a transmission of said data;
 at least one device coupled to said communication interface for receiving and transmitting said data;
 said processor including a plurality of modes of operation including:
  a first mode of operation, further comprising a digital signal including a series of digital bits wherein the digital bits are grouped into a plurality of types of groups, and in which said processor associates each possible type of group with one of a plurality of output levels;
  a second mode of operation in which said processor associates a particular one of said output levels with a clock output level; and
  a third mode of operation in which said processor generates an output signal including a transmission of said one of said output levels for each of said plurality of groups of said digital bits, and a transmission of said clock output level after each transmission of said one of said output levels for each of said plurality of groups of said digital bits.

17. The apparatus according to claim 16 further comprising a fourth mode of operation in which said processor generates a clock signal utilizing said transmission of said clock output level in response to a receipt of said output signal.

18. The apparatus according to claim 16 further comprising a fifth mode of operation in which said processor generates a second digital signal utilizing said received one of said output levels for each group of said digital bits and said received clock output level, wherein said second digital signal is the equivalent of said first digital signal.

19. The apparatus according to claim 16 wherein each said group of said digital bits is associated with a magnitude of a pulse with respect to a median value and wherein said transmission of said one of said output levels for each said group of said digital bits includes said pulse alternating between rising and falling modes, wherein said magnitude is a magnitude of either a rising or falling pulse and said clock level is associated with a median pulse value transmitting said pulse.

20. The apparatus according to claim 16 further comprising means for signaling a command mode transmission, wherein the apparatus enters a mode for receiving commands.

21. The apparatus according to claim 20 further comprising means for receiving receive reference voltage levels and means for adjusting receive reference voltage levels in response to receipt of a calibration command.

22. The apparatus according to claim 21 further comprising means for adjusting output voltage levels in response to the signaling command mode transmission.

23. The apparatus according to claim 16 further comprising means for using a plurality of most significant bits of the plurality of bits transmitted.

24. A method for communication of data, comprising the steps of:

associating an output level for each of a plurality of types of groups of data bits, wherein each type of group of data bits comprises at least one digital bit;

associating another output level for a clock;

inputting a digital signal comprising a series of digital bits; and generating an output signal having output levels corresponding to the digital signal and clock.

25. A data signal stored in a circuit for communicating clock and data information from a first signal in a data processing system, comprising a plurality of signal levels, wherein at least two of the plurality of signal levels represents the data information; every communicable unit of data is associated with a specific signal level; and at least one of the plurality of signal levels represents the clock information.

26. The method of claim 1 wherein each of the plurality of groups of digital bits have the same number of digital bits such that there are a finite number of possible types of groups.

* * * * *